United States Patent

Flanagan

[15] 3,703,688

[45] Nov. 21, 1972

[54] DIGITAL ADAPTIVE-TO-LINEAR DELTA MODULATED SIGNAL CONVERTER

[72] Inventor: James Loton Flanagan, Warren, N.J.

[73] Assignee: Bell Telephone Laboratories, Incorporated, Murray Hill, Berkeley Heights, N.J.

[22] Filed: April 7, 1971

[21] Appl. No.: 132,059

[52] U.S. Cl. .....................332/1, 325/38 B, 332/11 D

[51] Int. Cl. .............................................H03k 13/22

[58] Field of Search ..........332/1, 11, 11 D; 325/38 B

[56] References Cited

UNITED STATES PATENTS

| | | | |
|---|---|---|---|
| 3,506,917 | 4/1970 | Bond | 332/11 D X |
| 2,852,745 | 9/1958 | Kohs | 332/1 |
| 3,394,313 | 7/1968 | Ellis et al. | 332/1 X |
| 3,339,142 | 8/1967 | Varsos | 325/38 B |

*Primary Examiner*—Alfred L. Brody
*Attorney*—R. J. Guenther and William L. Keefauver

[57] ABSTRACT

A digital adaptive delta modulated (ADM) to linear delta modulated (LDM) signal converter is disclosed which operates at a predetermined multiple, *m*, of the applied adaptive modulated signal bit rate, 1/T. At each pulse time of the ADM signal, the adaptive step size is determined in a conventional manner; the determined step size is then utilized to develop a signal which is a linear delta modulated representation of the applied ADM signal.

13 Claims, 4 Drawing Figures

INVENTOR
J. L. FLANAGAN
BY Gerald E. Murphy
ATTORNEY

DIGITAL ADAPTIVE-TO-LINEAR DELTA MODULATED SIGNAL CONVERTER

BACKGROUND OF THE INVENTION

This invention pertains to digital transmission systems and, more particularly, to apparatus for converting adaptive delta modulated (ADM) signals to linear delta modulated (LDM) signals.

A delta modulator encodes analog signals by representing the change in amplitude of an applied analog signal by a train or series of binary pulses. In a typical delta modulator, the applied analog signal is compared with an approximate historical replica of the applied signal, applied by a process of feedback, accumulation, and comparison; if the applied signal is greater than the approximating signal, a first, e.g., positive pulse or +1, signal is developed by the modulator; if, on the other hand, the signal is less than the locally generated approximation signal, a second, e.g., negative pulse or −1, signal is developed by the modulator. In a linear delta modulator, the developed approximating signal increases or decreases in a fixed stepwise fashion as the input signal varies. There is a direct linear relationship between changes in magnitude in the applied signal and in the approximating signal; hence, the name linear delta modulator. Because linear delta modulators utilize a fixed step size approximating signal, they suffer from the limitation that small values of step size introduce slope overload distortion during bursts of large signal slope and, on the other hand, large values of step size accentuate the granular noise during periods of small signal slope. Even when the step size is optimized, the performance of these modulators may be satisfactory only at undesirably high sampling frequencies.

Several types of adaptive delta modulators have been proposed to overcome these problems inherent in linear delta modulators. In these adaptive modulation schemes, the approximating signal step size changes in accordance with the time varying slope characteristics of the input signal, as determined by a predetermined adaption strategy. Such adaption or "companding" can be either at a syllabic rate (long term) or instantaneous (short term). Thus, adaptive modulators are characterized by a selective alteration of the step magnitude in response to changes in the applied signal.

However, as in comparing most technical alternatives, one or the other of the alternatives has certain advantages in particular system environments. For example, adaptive delta modulation is an economically attractive means for digitalizing speech signals for transmission. At a 60 kilohertz (kz) sampling rate, a signal quality comparable to seven-bit log pulse code modulation (PCM) can be maintained. Linear delta modulation, on the other hand, has attractive features which may be utilized in time division switching, digital filtering, and conversion to PCM and DPCM codes. To maintain signal quality comparable to seven-bit log PCM, a linear delta modulator must be operated at high bit rates, typically in the order of megahertz. Such high bit rate operations are, of course, economically unfeasible for transmission, but are advantageous for signal processing within, for example, a single central telephone office. Thus, it is apparent that there are instances where one desires to have signals encoded via adaptive delta modulation while there are other instances when coding using linear delta modulation is advantageous.

Methods for converting from adaptive delta modulation to linear delta modulation are consequently of great interest. Of course, an adaptive delta modulated signal may be converted by digital-to-analog detection techniques and reencoding the resulting analog signal using a linear delta modulator, i.e., a digital-analog-digital process. However, degradation owing to the inaccuracy and instability of analog conversion apparatus usually attaches to such an involved operation. A more desirable solution is a direct digital transformation of the adaptive modulated bit stream into a linear modulated bit stream.

It is therefore an object of this invention to digitally convert an applied adaptive delta modulated (ADM) signal into a linear delta modulated (LDM) signal.

SUMMARY OF THE INVENTION

This and other objects of this invention are accomplished by modifying a conventional adaptive delta modulator receiver to digitally convert ADM signals to LDM signals at a rate which is a predetermined multiple, $m$, of the applied ADM signal bit rate, $1/T$. At each pulse or bit time of the ADM signal, a signal proportional to the adaptive step size is utilized to gate a train of pulses, generated by a clock operating at a rate $m/T$, to an integrator and an output combining network. The staircase waveform developed by the integrator is compared with the proportional step size signal and upon equality, pulses are no longer applied to the integrator but, instead, are applied via a flip-flop circuit to the output combining network. Thus, for each ADM signal pulse, a series of pulses of fixed polarity and linearly related in number to the proportional step size signal is developed for a portion of the ADM pulse interval, and for the remainder of the ADM pulse interval, a series of pulses, alternating between two fixed magnitude levels, is developed. In another embodiment, an $m$-stage countdown counter is selectively used to accomplish the desired signal conversion.

DETAILED DESCRIPTION OF THE INVENTION

Figure 1:
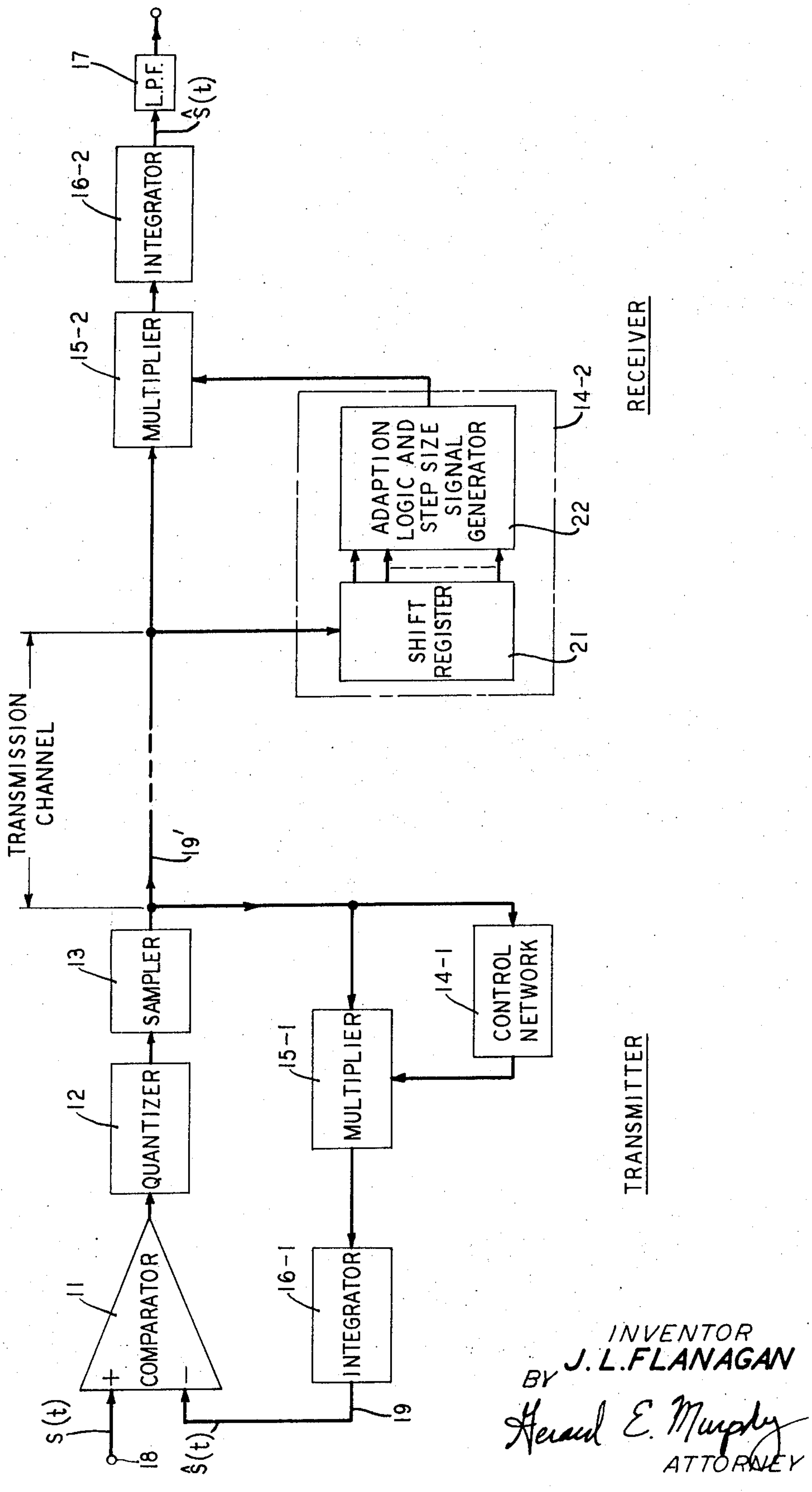
FIG. 1 (PRIOR ART)
FIG. 1 depicts a prior art adaptive delta modulated signal transmission system.

FIG. 1 depicts a typical prior art ADM signal transmitter and receiver, also known as an ADM signal coder/decoder (codec.). A band limited signal $s(t)$, e.g., a voiceband signal, is applied via input terminal 18 to comparator 11 wherein it is compared with a locally developed historical estimate $\hat{s}(t)$ of the applied signal, supplied via lead 19. The difference between the two signals, $s(t)$ and $\hat{s}(t)$, is developed by comparator 11 and the difference signal applied to quantizer 12, which may illustratively use a bipolar signal to quantize the difference signal; e.g., a positive pulse signal, +1, is developed when the difference signal is positive, and a negative pulse signal, −1, is developed when the signal output of comparator 11 is negative. This quantized difference signal is then sampled every T seconds by sampler 13 and the resultant binary signal representing the sign of the difference signal transmitted via transmission channel 19 to the ADM signal receiver. The developed binary pulse signal is also used at the transmitter to develop signal $\hat{s}(t)$ at the output of integrator 16–1. The binary pulse signal is supplied to multiplier 15–1 and to control network 14–1 to develop an adaptive step signal which is used to increment or decrement integrator 16–1. The amount by which the signal level of integrator 16–1 is changed depends upon the immediate past history of the channel bits, which is reflected in the step signal size developed by multiplier 15–1. A particular adaptive scheme for step size control which has been found to be advantageous has one-bit of memory and exponential adaption, as discussed by N. S. Jayant in the article titled "Adaptive Delta Modulation With a One-Bit Memory," *Bell System Technical Journal*, Vol. 49, pp. 321–342, March 1970. In such a scheme, at each sample time, the current, i.e., immediate or present, channel bit and the most recent, i.e., immediately past, channel bit are compared; if they are the same, as determined by network 14–1, the binary pulse signal applied to multiplier 15–1 is multiplied by a predetermined factor P. If they are different, the pulse signal is multiplied by a factor Q = 1/P. This reciprocal relationship insures common ascending and descending values of the adaptive step signal, which has been shown to be of very practical and advantageous result in typical systems.

It will be noted that the ADM signal receiver of FIG. 1 is essentially the same as the feedback portion of the transmitter of FIG. 1. Control network 14–2 corresponds to control network 14–1. Similarly, multipliers 15–1 and 15–2 are identical as are integrators 16–1 and 16–2. Thus, the receiver generates a signal which, ideally, is the same as estimate signal $\hat{s}(t)$ developed on line 19 in the feedback path of the transmitter. Of course, the adaption scheme utilized for the system of FIG. 1 may be of any well-known type; for illustrative purposes the Jayant scheme, discussed above, is shown. In control network 14–1 or 14–2, a shift register 21 stores the *n*, e.g., one, two, etc., most recent channel bits. Network 22 examines the current and *n* most recent channel bits, stored in shift register 21, and makes branching decisions which in turn affect the generation of a signal which is proportional to the desired step size multiplier. Low-pass filter 17 removes undesired irregularities in the signal developed by integrator 16–2 to develop the final signal output of the ADM signal transmission system. Discussion of various other prior art adaptive systems may be found in the article entitled "Delta Modulation" authored by H. R. Schindler, appearing in *IEEE Spectrum*, October 1970, p. 69, and in the copending applications of D. J. Goodman now issued as U.S. Pat. No. 3,652,957 on Mar. 28, 1972 and S. K. Tewksbury (Case 1), Ser. No. 94,458, filed Dec. 2, 1970.

Figures 2, 3, 4:
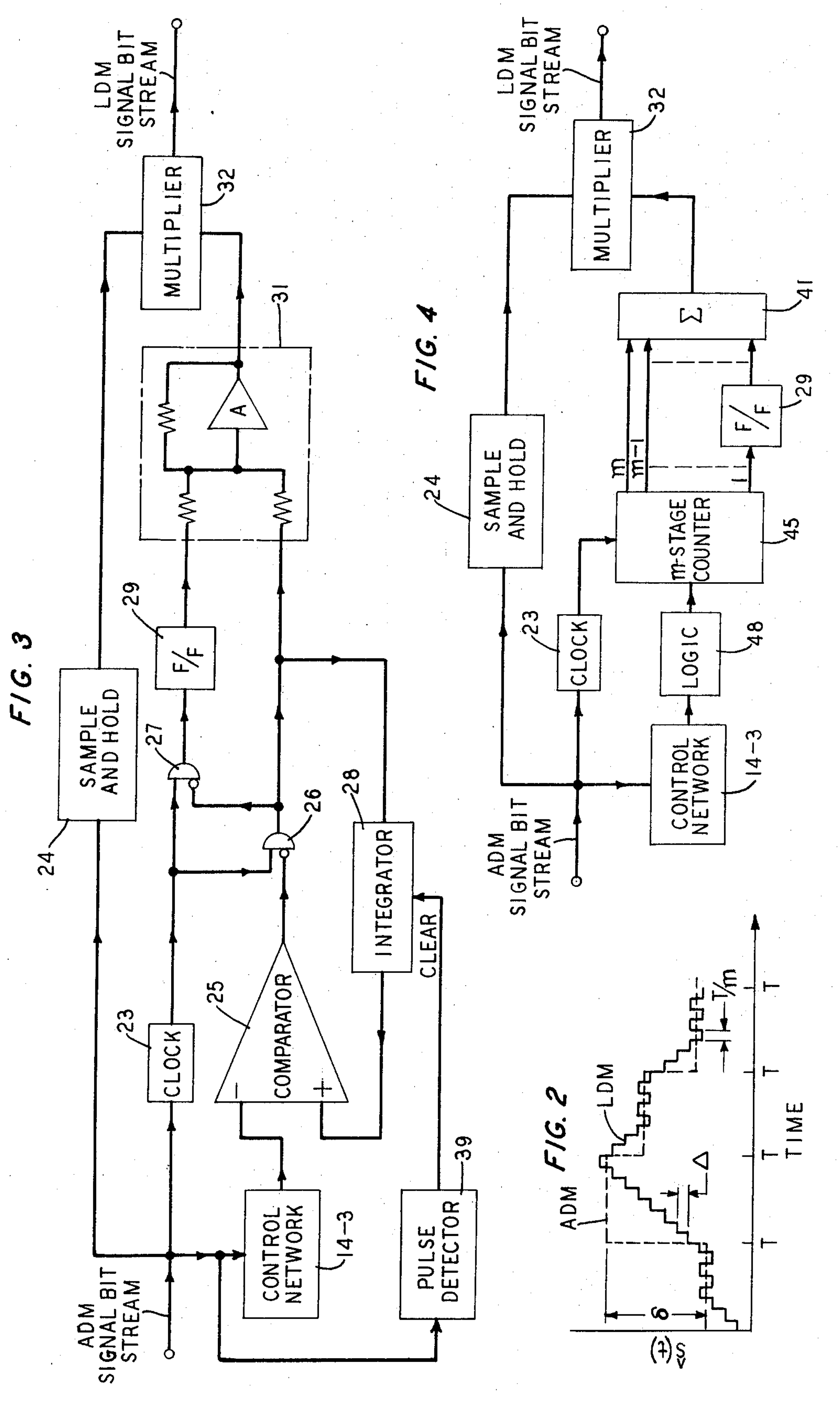
FIG. 2 is a waveform diagram illustrating the adaptive to linear delta modulated signal conversion process of this invention.
FIG. 3 depicts an adaptive to linear delta modulated signal converter utilizing the principles of this invention.
FIG. 4 depicts an alternative embodiment of the signal converter of this invention.

FIG. 2 is a graphical portrayal of the desired adaptive-to-linear delta modulation signal conversion which is accomplished by this invention. The broken line staircase waveform represents a typical detected ADM bit stream signal, e.g., the output $\hat{s}(t)$ of integrator 16–2 of FIG. 1. The solid staircase waveform represents the corresponding detected linear delta modulated bit stream signal. It will be noted that the integrated adaptive signal has increases and decreases of unequal increments while the integrated linear signal has increases and decreases of a fixed increment. Since not all the adaptive steps are of the same magnitude, it is required that a selective number of unipolar linear pulse signals be utilized for each applied adaptive step.

This is accomplished by the apparatus of this invention, depicted in FIG. 3, which converts an applied adaptive delta modulated bit stream into a linear delta modulated bit stream. It will be noted in FIG. 3 that an adaptive delta modulated signal is supplied to control network 14–3, which may be identical to control networks 14–1 and 14–2 of FIG. 1, to a clock 23 and to a sample and hold network 24. Clock 23 is synchronized to run at a predetermined rate *m* times faster than the applied ADM bit rate, 1/T. Thus, the linear delta modulated signal bit rate will be *m*/T, which may, in a typical example, be equal to 16 times the ADM signal bit rate. For each applied pulse of the ADM signal control network 14–3 develops a signal proportional to the adaptive step size multiplier in a manner identical to that accomplished by the apparatus of FIG. 1. The proportional step size multiplier signal is applied to comparator 25 wherein it is compared with a feedback signal from integrator 28. The output of comparator 25 is applied to AND-circuit 26, via an inhibit terminal. When the applied step size multiplier signal is larger than the feedback signal, the output of comparator 25 enables AND-circuit 26 and thus allows pulses from clock circuit 23 to be applied via AND-circuit 26 to integrator 28 and network 31. Clock 23, which operates at a rate, for example, of *m* times the ADM bit rate, develops signal pulses of a fixed polarity for application to AND-circuits 26 and 27. The pulses applied to integrator 28 via AND-circuit 26 are accumulated and thus there is developed at the output of integrator 28 a staircase waveform. When this staircase waveform signal attains a level equal to the step size multiplier signal AND-circuit 26 is inhibited by comparator 25. But, as a direct consequence of the change in the output signal of inhibited AND-circuit 26, AND-circuit 27 is enabled, thereby allowing the remainder of the clock pulses for the given ADM bit period to be applied to flip-flop, i.e., multivibrator, 29. Flip-flop 29 simply alternates the polarity of each applied clock pulse, e.g., between a +1 and a −1 level, and applies the alternated output pulses to network 31. Network 31 conveys the pulses applied to it to multiplier 32. Each applied ADM pulse also activates detector 39 which "dumps" or clears integrator 28 prior to the development of a new staircase waveform.

Sample and hold network 24 is utilized to impart the proper polarity to the linear delta modulated bit stream developed by network 31 during each ADM signal bit period. Network 24 stores the most recent applied ADM bit; this bit is used to multiply, within multiplier 32, the linear delta modulated signal bit stream emanating from network 31.

FIG. 4 depicts an alternative embodiment of this invention for converting an ADM signal to a LDM signal. Components identical to those of FIG. 3 are identically numbered. For each applied pulse of the ADM signal, control network 14–3 develops a signal proportional to the adaptive step multiplier. This adaptive step signal is used, via conventional logic circuitry 48, to preset countdown counter 45. Counter 45, which has *m* stages, is set to the number of (constant) linear delta steps needed to represent the applied adaptive step signal. During the ADM bit period, clock 23 steps down counter 45 which applies the required number of linear delta step pulses to combining network 41. Upon reaching its number-one position, counter 45 "hangs" in this position, i.e., it does not "wrap around," for the remainder of the ADM period, issuing pulses from its number-one position at the linear delta rate. These latter pulses are converted to alternate polarities by flip-flop 29 and applied to network 41. The subsequent operation of the apparatus of FIG. 4 is identical to that of FIG. 3.

As shown in FIG. 2, the staircase waveform (solid line) developed by integrating the LDM bit stream, provided by the apparatus of this invention, increases at an equal rate until a level is reached which is equal to or somewhat greater than the adaptive step size (broken line). If *m* pulses have not been utilized to reach this level, the remaining pulses developed by flip-flop 29 hunt, so to speak, about this established level until the adaptive signal bit period is completed. Stated another way, if $\Delta$ is the linear delta modulation step size and $\delta$, the adaptive delta modulation step size, then the number of linear steps needed to span $\delta$ is $n = (\delta/\Delta)$, to the nearest integer. After *n* steps, the LDM signal vacillates about the ADM signal step level for the remainder of the ADM signal period $[(m-n/m)\,T]$. To ensure that each ADM signal step level is attained by a series of linear delta modulated signal pulses, $n \leq m = \delta_{max}/\Delta$, where $\delta_{max}$ is the maximum ADM signal step size. In a well-designed ADM system, $\delta_{min}$, the minimum adaptive step size, is chosen for an acceptable level of granular noise in the encoding of the original analog signal, $s(t)$. A corresponding desirable choice for the LDM signal may be $\Delta < \delta_{min}$, although a larger value of $\Delta$ would be satisfactory because of the higher sampling rate employed for the LDM signal.

The LDM converted signal lags the ADM signal by a time interval linearly proportional to the magnitude of the instant ADM signal step. If the original ADM signal is in a slope overload phase, and being incremented with its maximum step size, then the LDM signal will also be in an overload phase, but by an amount about the same as that of a conventional LDM version of the original applied signal. If the ADM signal is hunting with minimum adaptive step size, then the converted LDM signal will also hunt with a comparable step size. If the ADM signal is hunting with nonminimum step size, the lag in conversion will act to reduce granular distortion. The converted signal is therefore effectively a LDM representation of the original speech signal $s(t)$.

What is claimed is:

1. An adaptive delta modulated to linear delta modulated signal converter comprising:
   - means for supplying a signal which has been encoded in accordance with a predetermined adaptive delta step size strategy;
   - means responsive to said supplied signal for developing a signal proportional to the adaptive delta step size of said supplied signal;
   - clock means responsive to said supplied signal for developing timing pulses at a predetermined multiple, *m*, of the pulse rate, 1/T, of said supplied signal;
   - pulse developing means responsive to said proportional step signal and said timing pulses for selectively developing a train of pulses linearly representative of said adaptive delta step size;
   - means responsive to said supplied signal for developing signals representative of the polarity of said supplied signal;
   - and means for selectively multiplying said polarity representative signals and said train of pulses to develop a linear delta modulated output signal.

2. The signal converter apparatus of claim 1 wherein said pulse developing means further comprises:
   - a comparator circuit responsive to said proportional adaptive delta step size signal and an applied integrated feedback signal;
   - a first logic circuit selectively responsive to said clock timing pulses and the output signal of said comparator circuit;
   - an integrator circuit responsive to said first logic circuit for supplying said integrated feedback signal to said comparator circuit;
   - a second logic circuit selectively responsive to said clock timing pulses and the output signal of said first logic circuit;
   - a multivibrator circuit responsive to the output signal of said second logic circuit;
   - and a combining circuit responsive to the output signals of said first logic circuit and said multivibrator circuit for developing said train of pulses 3. Apparatus for converting an adaptive delta modulated signal to a linear delta modulated signal comprising:
   - means for supplying a signal which has been encoded in accordance with a predetermined adaptive delta step size strategy;
   - means responsive to said supplied signal for developing a signal representative of the adaptive step size of said supplied signal;
   - means responsive to said supplied signal for developing timing pulses at a predetermined multiple of the pulse rate of said supplied signal;
   - and means responsive to said representative signal and said timing pulses for selectively developing a plurality of pulses linearly representative of said adaptive step size.

4. The converter apparatus of claim 3 wherein said means for selectively developing a plurality of pulses linearly representative of said adaptive step size further comprises:
   - an output signal combining circuit;
   - a first gate circuit for selectively transmitting said timing pulses to said combining circuit;
   - an integrator for integrating said pulses transmitted by said first gate circuit;
   - a comparator circuit responsive to said representative adaptive step size signal and said integrator output signal for inhibiting said first gate circuit when said integrator output signal equals said representative adaptive step size signal;

a second gate circuit responsive to the output signal of said first gate circuit for selectively transmitting said timing pulses when said first gate circuit is inhibited;

and pulse magnitude alternating means for selectively supplying said pulses transmitted by said second gate circuit to said combining circuit.

5. An adaptive delta modulated to linear delta modulated signal converter comprising:

adaptive delta modulator apparatus responsive to an applied adaptive delta modulated signal for developing a signal proportional to the adaptive step size of said applied signal;

clock means responsive to said applied signal for developing timing pulses at a predetermined multiple, $m$, of the pulse rate, $1/T$, of said applied signal;

signal pulse developing means responsive to said proportional signal and said timing pulses for selectively developing during each applied signal pulse interval, T, a first plurality of pulses, the number of said pulses being proportional to said adaptive step size, and a second plurality of alternating pulses for the remainder of said applied signal pulse interval;

means responsive to said applied signal for developing signals representative of the polarity of said applied signal;

and means for selectively combining said polarity representative signals and said first and second plurality of pulses to develop a linear delta modulated signal.

6. The signal converter apparatus of claim 5 wherein said signal pulse developing means further comprises:

a comparator circuit responsive to said proportional adaptive step size signal and an applied integrated feedback signal;

a first logic circuit selectively responsive to said clock timing pulses and the output signal of said comparator circuit;

an integrator circuit responsive to said first logic circuit for supplying said integrated feedback signal to said comparator circuit;

a second logic circuit selectively responsive to said clock timing pulses and the output signal of said first logic circuit;

a flip-flop circuit responsive to the output signal of said second logic circuit;

and a combining circuit responsive to the output signals of said first logic circuit and said flip-flop circuit for developing said first and said second plurality of pulses 7. Signal conversion apparatus comprising:

means responsive to an applied adaptive delta modulated signal for developing a signal proportional to the adaptive step size of said applied signal;

means responsive to said applied signal for developing clock pulses at a predetermined multiple of the pulse rate of said applied signal;

and means responsive to said proportional signal and said clock pulses for selectively developing during each applied signal pulse interval, a first plurality of pulses, the number of said pulses representative of said adaptive step size, and a second plurality of pulses of alternating magnitude.

8. The apparatus of claim 7 wherein said means for selectively developing said first and second plurality of pulses further comprises:

an output signal combining circuit;

a first gate circuit for selectively transmitting said clock pulses to said combining circuit;

an integrator for integrating said pulses transmitted by said first gate circuit;

a comparator circuit responsive to said proportional adaptive step size signal and said integrator output signal for inhibiting said first gate circuit when said integrator output signal equals said proportional adaptive step size signal;

a second gate circuit responsive to the output signal of said first gate circuit for selectively transmitting said clock pulses when said first gate circuit is inhibited;

and pulse magnitude alternating means for selectively supplying said pulses transmitted by said second gate circuit to said combining circuit.

9. A digital adaptive delta modulated to linear delta modulated signal converter responsive to an applied adaptive delta modulated signal encoded in accordance with a predetermined adaptive step size strategy comprising:

means responsive to said applied signal for developing a signal representative of said applied signal adaptive step size;

means responsive to said applied signal for developing clock pulses at a predetermined multiple of the pulse rate of said applied signal;

and means responsive to said representative adaptive step signal and said clock pulses for developing a plurality of linear step signals corresponding to said adaptive step signal.

10. The signal converter of claim 9 wherein said means for developing a plurality of linear step signals further comprises:

a comparator circuit responsive to said representative adaptive step signal and an applied integrated feedback signal;

a first logic circuit selectively responsive to said clock pulses and the output signal of said comparator circuit;

and an integrator circuit responsive to said first logic circuit for supplying said integrated feedback signal to said comparator circuit.

11. The signal converter of claim 10 further comprising:

a second logic circuit selectively responsive to said clock pulses and the output signal of said first logic circuit;

a multivibrator circuit responsive to the output signal of said second logic circuit;

and a combining circuit responsive to the output signals of said first logic circuit and said multivibrator circuit for developing said linear step signals.

12. The signal converter of claim 9 wherein said means for developing a plurality of linear step signals further comprises:

an output signal combining circuit;

a first logic circuit for selectively transmitting said clock pulses to said combining circuit;

an integrator for integrating said pulses transmitted by said first logic circuit;

a comparator circuit responsive to said representative adaptive step signal and said integrator output signal for inhibiting said first logic circuit when said integrator output signal equals said representative adaptive step signal;

a second logic circuit responsive to the output signal of said first logic circuit for selectively transmitting said clock pulses when said first logic circuit is inhibited;

and pulse magnitude alternating means for selectively supplying said pulses transmitted by said second logic circuit to said combining circuit.

13. An adaptive delta modulated to linear delta modulated signal converter responsive to an applied adaptive delta modulated signal encoded in accordance with a predetermined adaptive delta step size strategy comprising:

means responsive to said applied signal for developing a signal proportional to the adaptive delta step size of said applied signal;

clock means responsive to said applied signal for developing timing pulses at a predetermined multiple of the pulse rate of said applied signal;

counter means responsive to said proportional signal and said timing pulses for selectively developing a first plurality of pulses, the number of said pulses corresponding to said adaptive delta step size, and a second plurality of pulses for the remainder of said applied signal pulse interval;

means for alternating the polarity of said second plurality of pulses;

means responsive to said applied signal for developing a signal representative of the polarity of applied signal;

and means for selectively combining said polarity representative signal, said first plurality of pulses, and said second alternated polarity plurality of pulses, to develop a linear delta modulated signal.

* * * * *